United States Patent [19]
Cole

[11] 3,866,011
[45] Feb. 11, 1975

[54] INSTRUCTIONAL APPARATUS FOR UNDERWATER WELDING

[76] Inventor: Edgar C. Cole, 724 B St., Taft, Calif. 93268

[22] Filed: July 9, 1973

[21] Appl. No.: 377,640

[52] U.S. Cl. ........................ 219/72, 35/13, 219/137
[51] Int. Cl. .............................................. G23k 9/00
[58] Field of Search ............................. 219/137, 72

[56] References Cited
UNITED STATES PATENTS

| | | | |
|---|---|---|---|
| 2,985,129 | 5/1961 | Kirkpatrick | 219/72 X |
| 3,360,629 | 12/1967 | Bridoux et al. | 219/72 |

FOREIGN PATENTS OR APPLICATIONS

| | | | |
|---|---|---|---|
| 182,810 | 11/1966 | U.S.S.R. | 219/72 |

OTHER PUBLICATIONS

"Welding Chamber" – Welding Engineer – December 1957, p. 84.

*Primary Examiner*—C. L. Albritton
*Assistant Examiner*—G. R. Peterson
*Attorney, Agent, or Firm*—Sellers and Brace

[57] ABSTRACT

Instructional apparatus for use in gaining experience in underwater welding having submerged welding facilities in a water container provided with a below-water level viewing window and a pair of rubber gloves secured to the container wall below water level. The water includes a small quantity of acid which reacts with and renders non-obscuring suspended opaque particulate unavoidably generated during welding. Putting on and taking off the gloves is facilitated by one of several techniques for temporarily relieving the hydraulic head on the gloves. Welding is carried out on a workpiece clamped to a support readily adjustable to a desired submerged position.

25 Claims, 4 Drawing Figures

INSTRUCTIONAL APPARATUS FOR UNDERWATER WELDING

This invention relates to instructional apparatus and more particularly to apparatus for gaining actual experience in underwater welding without need for the operator entering or coming in direct contact with the water.

The technique of performing underwater welds is highly specialized and differs in numerous respects from techniques used in making non-submerged welds. These specialized techniques have been acquired heretofore by operators wearing various types of breathing equipment while submerged in a large tank of water. An instructor must either don similar breathing equipment and accompany the operator or endeavor to provide assisting instruction from a viewing station outside the water and using waterproofed communication equipment. Welding instructions and experience carried out in this manner involve numerous obvious handicaps and disadvantages all of which are circumvented by the present invention using the simple, compact, inexpensive welding simulator provided by this invention without need for either the instructor or the operator entering the water. This is made possible by locating the welding station in a relatively small water tank equipped with a submerged viewing window and having the inlets of long-armed rubber gloves sealed about openings in the tank wall adjacent the viewing window. One of several expedients may be used to relieve the hydraulic head while the operator is putting on and taking off the gloves. The workpiece may be clamped to a vertically and rotationally adjustable support.

An important feature of the invention involves the use of a body of water in which is dispersed a small quantity of an acid effective to react with and render non-obscuring particulate customarily generated during welding. The prompt conversion of this obscuring particulate maintains the water clear at all times and avoids need for circulating fresh water through the tank to carry away the particulate which is too fine for removal by filtration.

One mode of relieving the hydraulic head involves enclosing the operator's hands with an open-ended chamber from which water can be withdrawn faster than it enters as by a suitable recirculating pump. Another technique is to lower the water level temporarily as by draining the water quickly to a storage reservoir and then restoring the water level in the main container after the gloves have been put on or taken off. While the gloves are off, they may be held captive within a closure cover for the glove inlet which remains in place over the inlet until the static head of water has been relieved.

Accordingly, it is a primary object of this invention to provide a unique instructional device for use in gaining experience in underwater welding.

Another object of the invention is the provision of an improved apparatus and method for use in making underwater welds by an operator having only his hands under water and viewing the workpiece through a window in the tank wall.

Another object of the invention is the provision of simple, easily-operated apparatus for use in making underwater welds by an operator substantially entirely outside the apparatus.

Another object of the invention is the provision of underwater welding apparatus for use by an operator located in room air and provided with simple, readily-operated means for relieving the static head on the operator's gloves.

Another object of the invention is the provision of an underwater instructional welding apparatus having a main tank in which the welding apparatus is submerged and an auxiliary tank to which the liquid contents of the main tank can be quickly transferred.

Another object of the invention is the provision of an apparatus and a method of underwater welding with provision for disposing of opaque particles generated in the welding process as the particles are formed thereby avoiding obscuring the operator's clear view of the welding area.

These and other more specific objects will appear upon reading the following specification and claims and upon considering in connection therewith the attached drawing to which they relate.

Referring now to the drawing in which a preferred embodiment of the invention is illustrated:

Figure 1:
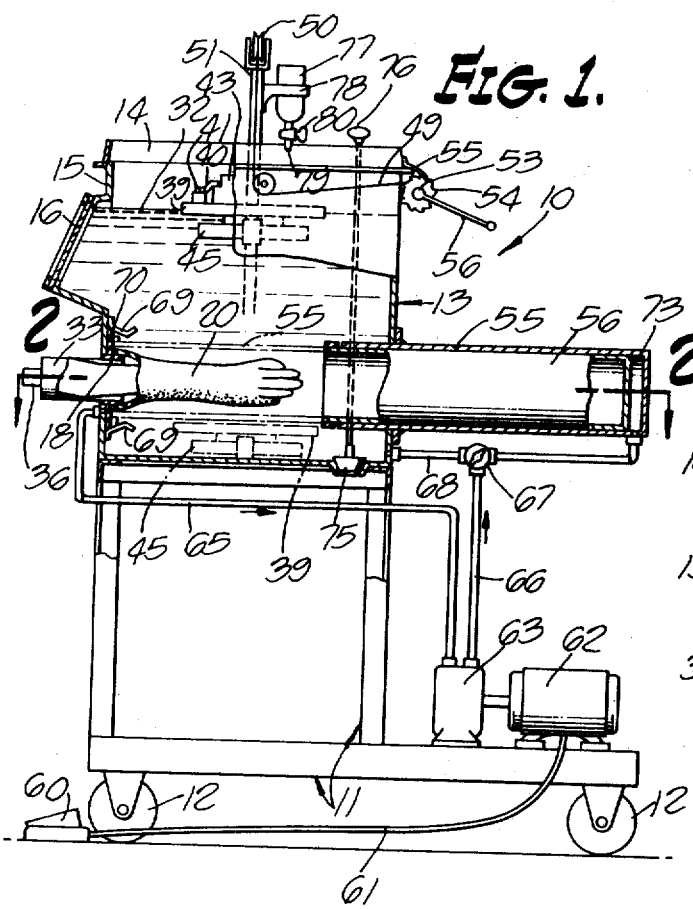
FIG. 1 is a side elevational view of an illustrative embodiment of the invention with portions of the apparatus broken away to show constructional details.
Figure 2:
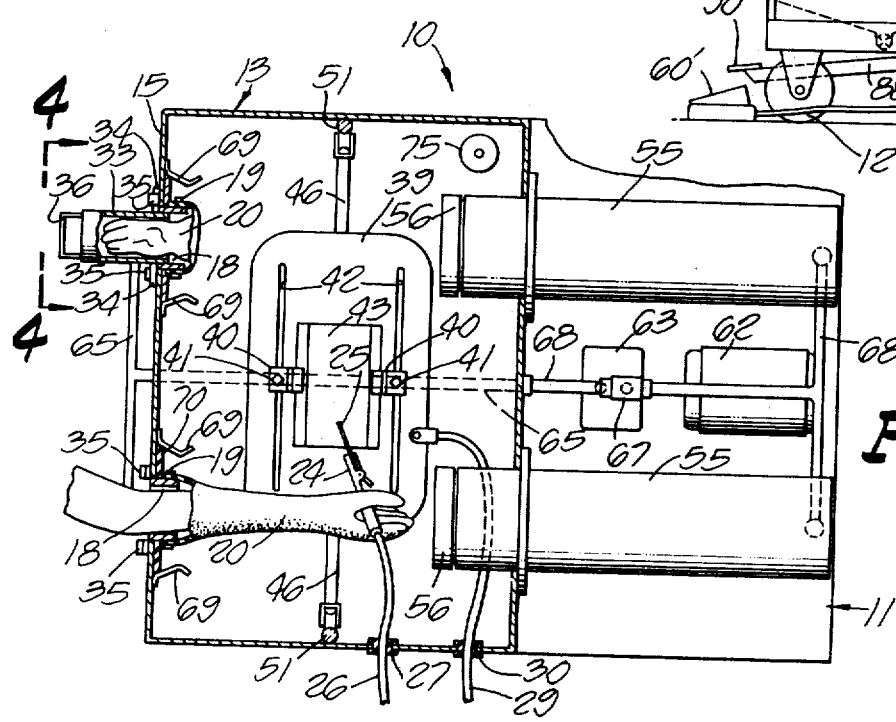
FIG. 2 is a fragmentary cross-sectional view on an enlarged scale taken along line 2—2 on FIG. 1.

Referring initially more particularly to FIGS. 1 and 2, there is shown a first illustrative embodiment of the invention underwater welding apparatus, designated generally 10. This apparatus has a main frame 11 supported on rollers 12 and provided with a large capacity open-top water container 13. The front wall 15 is provided with a large generally rectangular window 16 having its edges suitably sealed to an opening in the sidewall of the tank and disposed in a plane generally normal to the operator's view of the welding zone interiorly of the tank. Although only one window is shown it will be understood that one or both end walls of the container may be equipped with similar windows for the convenience of an instructor or other observer and providing them with the same clear view of the welding work as the operator himself.

Located below window 16 are two large area tubular ports 18 conveniently spaced for insertion therethrough of the operator's arms while engaged in welding. Securely anchored to the inner end of each of ports 18, as by clamps 19,19, are a pair of heavy duty rubber gloves 20,20. It will be understood that ports 18,18 are very substantially larger in diameter than an operator's arms to provide the operator with ample freedom of movement of his arms while making a weld on a workpiece.

The apparatus includes any suitable well-known type of welding rod holder 24 having means for securing a welding rod electrode 25 securely clamped therein. Power for electrode 25 is supplied to holder 24 through a flexible heavily insulated service cable 26 extending through a bushing 27 mounted in the sidewall of container 13. A second flexible insulated service cable 29 extends through a bushing 30 mounted on the container walls and has its inner end suitably connected to the conductive workpiece or a support for the workpiece in accordance with customary practice.

Figure 4:
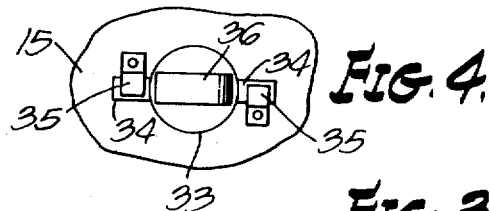
FIG. 4 is a fragmentary view taken along line 4—4 on FIG. 2.

Normally, the water level within container 15 is near the upper edge of window 16, as is indicated at 32. Under these conditions the water pressure surrounding the empty gloves will hold the gloves collapsed. Under these conditions the water tends to turn the gloves wrong side out or to project them outwardly through ports 18,18. To prevent this undesirable result, the outer ends of ports 18 are preferably closed when not in use by the detachable caps 33 sized to have a snug telescopic fit about ports 18. Projecting radially from the exterior of the cap sidewalls are a pair of lugs 34,34 (FIG. 4) engageable bayonet-fashion behind a pair of clips 35 welded or riveted to container wall 15. Caps 33 may be provided with a hand grip 36 to facilitate attachment and detachment of the caps over a respective one of ports 18.

The workpieces to be welded are clamped to a rotary support plaque 39 as by conductive clamps 40,40 having clamping bolts 41 slidable along slots 42 extending through the work support plaque 39. A workpiece 43 is shown clamped to the support plaque in FIGS. 1 and 2. Support plaque 39 is rotatably secured to a plate 45 on a vertical axis centrally of plate 45. This plate has rigid extensions 46 (FIG. 2) projecting from its opposite ends which are secured to the lower ends of a pair of cables 49,49 trained over pulleys 50 journalled on upright brackets 51 fixed to the opposite endwalls of container 13. The other ends of cables 49 are anchored to a shaft 53 mounted in suitable bearings fixed to the back wall of container 13. A ratchet wheel 54 fixed to shaft 53 cooperates with a dog 55 to hold the cable and the workpiece support 45 adjusted to any desired level between pulleys 50 and the bottom of the container. A crank 56 fixed to shaft 53 enables the operator to rotate the shaft 53 clockwise to elevate the workpiece support. Lowering of the support plaque can be accomplished by allowing the crank to rotate counterclockwise while dog 55 is held retracted from ratchet wheel 54.

It is not feasible for the operator to attempt putting the gloves on or taking them off without utilizing some means of reducing the static head of water within the container. One convenient way of accomplishing this is to equip container 13 with a pair of tubes 55 slidably supporting therein a respective piston tube 56. The tubes 55 are welded or otherwise securely mounted in openings in the rear wall of container 13. Both pairs of tubes are open at their left hand ends but closed at their right hand ends. As is clearly shown in FIG. 2, the set of tubes is mounted in axial alignment with a respective one of the ports 18 for the operator's gloves.

Normally the piston tubes 56 are fully retracted within the outer tubes 55 as is shown in FIGS. 1 and 2. However, when the operator wishes to place his hands in gloves 20, he steps on a foot-operated switch 60 located on the floor or other position convenient to the operator's foot and closes a circuit through cable 61 to energize motor 62 driving the water circulating pump 63. When the motor is energized, the pump withdraws water from the container in an area immediately adjacent the exterior of each of the ports 18, this water passing along conduit 65, the pump, conduit 66 and into chambers 73 at the outer ends of the cylinders 55. This slightly pressurized water shifts pistons 56 toward the front wall 15 of container 13. As the advance end of chamber 15 approaches ports 18 it is guided into position over the gloves by the pilot or guide clips 69 and seats against a thick resilient stop to gasket 70. Since the inlet to conduit 65 is located radially inwardly of the leading end of piston 56, the pump is effective to withdraw water from the interior of the piston and to circulate it to the outer end of cylinder 55. The increasing water pressure on the discharge side of pump 66 then opens a relief valve 67 and permits the water to flow back into tank 13 via conduit 68. In consequence, so long as the piston encloses gloves 20, the static head within the piston is quickly reduced to a negligible value allowing the operator to insert his hand into or withdraw it from the gloves easily. This having been accomplished, the piston is retracted by stepping on switch 60 a second time to pivot its actuator to a position reversing motor 62 and causing water to be withdrawn from chamber 73 at the outer end of cylinder 55 and circulated back into tank 13. The reversal of the static head acting on the pistons then causes both to retract to their normal non-operating positions shown in FIG. 1 after which the actuator of switch 60 is shifted to a neutral position to de-energize pump motor 62.

Should an emergency arise during use of the apparatus making it desirable for the operator's hands to be released from the gloves immediately the instructor or any person in the immediate vicinity can quickly open valve 75 in the bottom of container 13 by pulling upwardly on the valve operator 76. This dumps the water contents of the tank quickly to the sewer or any other area thereby reducing the water level and permitting the operator to withdraw his hands from the gloves.

An important feature of the invention comprises the addition of an agent to the water in tank 13 which reacts with the minute particulate typically produced by underwater welding operations and well known to underwater welders to obscure their view of the workpiece. The addition of sufficient muriatic acid to the water to maintain the pH in the range of three to five has been found to substantially eliminate obscuring particulate as fast as it is generated. A pH of five is about the minimum concentration found satisfactory and a concentration closer to pH 3 is preferred.

It is believed that metal heated by welding operations under water reacts with the water to form finely divided hydroxides which obscure the transparency of the water. Muriatic acid reacts with and converts these particles into non-obscuring material without objectionable harm to the equipment.

Suitable means for maintaining the pH of the water comprises a reservoir 77 supported on a bracket 78. The dispensing nozzle 79 at the bottom of the reservoir is equipped with a needle valve 80 for adjusting the acid discharged into tank 13 to replace acid consumed during welding. A replacement rate of about 1 drop per second has been found suitable during normal rates of welding to maintain the most effective pH value.

Figure 3:
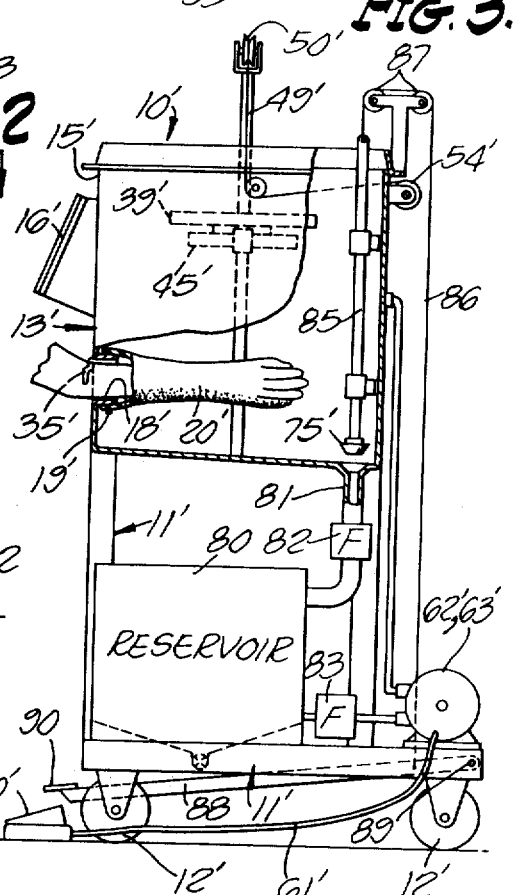
FIG. 3 is a side elevational view of a second preferred embodiment with parts broken away to show details.

A second embodiment of the invention illustrated in FIG. 3 differs from the first described mode essentially in utilizing a different means for reducing the static head within the water container. The same or corresponding components of the second embodiment are indicated by the same reference characters employed in describing FIGS. 1 and 2 but distinguished by the addition of a prime. Mounted on frame 11' below the main water container 13' is a storage reservoir 80 having a capacity sufficient to contain a major portion of the contents of tank 13'. This vented tank is connected directly to the bottom of tank 13 through a large diameter pipe 81 equipped with a filter 82. Normally the inlet to pipe 81 is closed by the emergency dump valve 75' and provided with a guided operating rod 85. The upper end of rod 85 is connected through cabling 86 trained over bracket-supported rollers 87 to an operating lever 88 pivoted to frame 11' by pivot pin 89 and normally biased upwardly by a spring not shown. The forward end of lever 88 is conveniently located at the front of the apparatus and is equipped with a foot pedal 90 to open valve 75'.

The water is returned to container 13' from emergency chamber 80 by depressing foot pedal 90 and lever 88 to start the motor driven pump unit 62',63'. Preferably, the water is withdrawn from reservoir 80 through a second filter 83. In all other respects the second embodiment shown in FIG. 3 operates and is used in the same manner as the first described embodiment. It will be understood that the Figure 3 construction preferably includes means such as that described above for replenishing the acid content of the water and maintaining the pH between three and five.

The mode of using the equipment will be readily apparent from the foregoing detailed description. It will be understood that a workpiece 43 to be welded is secured to the rotary plate 39 and lowered to a desired submerged level in container 13 and secured in this position by ratchet 54 and dog 55.

The operator inserts his hands into the gloves 20 after first relieving the static water head in the area immediately surrounding the gloves. Thereafter, he proceeds to use the welding rod holder 24 in the usual manner and in accordance with instructions give to him previously or while the welding work is actually in progress. The view of the welding work afforded by window 16 is fully as clear as through the operator were submerged in the water and wearing goggles and other underwater diving gear. The acid content of the water reacts with the very fine particulate by-product of the welding operation and quickly converted into nonobscuring products. Accordingly, the operator continues to have a clear view of the welding operator for prolonged periods by maintaining the pH level by acid added from reservoir 77. If desired, means may be provided to keep the water in circulation to facilitate dispersion of the particulate and newly added acid.

While the particular instructional apparatus for underwater welding herein shown and disclosed in detail is fully capable of attaiing the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. Underwater welding apparatus comprising: a main water tank having an opening in direct communication with the atmosphere during the use of said apparatus, workpiece support means, means for connecting a workpiece mounted on said support means to a source of electric welding power, a hand manipulatable welding electrode holder located inside said tank and connectable to a source of welding power, and workpiece viewing window means in the wall of said tank and disposed in a convenient line of sight for the welding operator stationed outside said tank under ambient atmospheric conditions.

2. Welding apparatus as defined in claim 1 characterized in the provision of means for adjusting the position of said workpiece support means from the exterior of said tank.

3. Welding apparatus as defined in claim 1 characterized in the provision of elastomeric glove means for the operator and including means for excluding water normally present within said tank from entering said glove means.

4. Welding apparatus as defined in claim 1 characterized in the provision of a pair of rubber gloves for enclosing the hands and arms of the operator and including means for sealing the inlet ends thereof to the wall of said tank in an area below the normal water level therein.

5. Welding apparatus as defined in claim 4 characterized in that said pair of rubber gloves is located generally below the water level in said tank.

6. Welding apparatus as defined in claim 1 characterized in the provision of a second water tank for holding a major portion of the normal water contents of said main tank, and means for transferring water between said tanks.

7. Welding apparatus as defined in claim 3 characterized in the provision of means for removing sufficient water from that portion of said main tank in which said glove means are submerged to facilitate withdrawing the operator's hands therefrom.

8. Welding apparatus as defined in claim 6 characterized in the provision of normally closed valve means between said two water tanks and effective when open to lower the water level in said main tank.

9. Welding apparatus as defined in claim 7 characterized in that said means for removing water from about the exterior of said glove means includes power driven pump means.

10. Welding apparatus as defined in claim 7 characterized in that said means for removing water from about the exterior of said glove means includes an open-ended tubular chamber submerged in the water in said main tank and sized to accommodate the operator's glove-enclosed hand, and means for withdrawing at least a portion of the water from said tubular chamber to facilitate putting on and taking off said glove means by the operator.

11. Welding apparatus as defined in claim 7 characterized in that said means for removing water from about the exterior of said gloves include rigid open-ended tubular means for embracing said glove means while being put on and taken off, and means for withdrawing water from the interior of said tubular means faster than water can enter the same thereby to facilitate putting on and taking off said glove means.

12. Welding apparatus as defined in claim 11 characterized in that said tubular means comprises a hollow piston having a fluid tight sliding fit within a cylindrical chamber opening into the interior of said water tank opposite said glove means, and means for moving said hollow piston into and out of position for use in putting on and taking off said glove means.

13. Welding apparatus as defined in claim 4 characterized in the provision of safety valve means for quickly dumping water from said main tank in an emergency to expedite removal of the operator's hands from said gloves.

14. Welding apparatus as defined in claim 4 characterized in the provision of readily attachable and detachable cap means for the entrance ends of said gloves and securable over said ends to prevent the static water head from turning said gloves wrong side out and outstretched from the exterior wall of said tank.

15. Instruction apparatus for use in gaining experience in underwater electric welding comprising: a water tank in direct communication with the atmosphere and normally charged with water to provide a welding station submerged in water, a flooded viewing window in the sidewall of said tank opposite said welding station, a hand manipulatable welding rod holder and electric service cord therefor, and a pair of rubber gloves having the inlet ends thereof sealed to openings through normally flooded openings in the tank wall adjacent said viewing window.

16. Instruction apparatus as defined in claim 15 characterized in the provision of means for relieving the static water head on said gloves while putting on and taking off the same.

17. Instruction apparatus as defined in claim 15 characterized in the provision of means for supporting a submerged workpiece to be welded at different submerged levels within said tank.

18. Instruction apparatus as defined in claim 15 characterized in the provision of foot controlled means for actuating means forming part of said apparatus and effective to relieve the static water head on said gloves quickly thereby permitting the operator to remove his hands from said gloves.

19. Instruction apparatus as defined in claim 15 characterized in that said water tank includes means for adding acid to the normal water charge thereof adequate to react with and render non-obscuring opaque matter generated by the welding arc during submerged welding operations.

20. Instruction apparatus for use in gaining experience in underwater electric welding comprising: a welding station including a hand-held manipulatable welding rod holder connectable to one side of an electric power source and a conductive work holder for parts to be welded connectable to the other side of an electric power source, and container means surrounding said welding station normally charged with water to a level maintaining said welding station submerged in water and containing a low concentration of acid effective to react with opaque matter generated during welding of a workpiece clamped in said work holder and rendering said opaque matter non-obscuring thereby providing the welding operator a clear view of the weld area.

21. Instruction apparatus as defined in claim 20 characterized in the provision of means for adding acid to the solution in said container means to maintain the acidity thereof as welding progresses and portions of the acid are consumed by reaction with said opaque matter.

22. That method of preventing opaque matter released into the water during submerged underwater electric welding from obscuring a view of the welding operation by the welding operator which method comprises utilizing a low concentration of an acid in the water present in the welding zone surrounding the operator's hand and the welding operation and effective to react with said opaque matter to render the same non-obscuring.

23. That method of maintaining an underwater welding zone free of opaque view-obscuring matter generated by electric welding which comprises adding a low concentration of acid to the water effective to react with the opaque matter and render the same non-obscuring.

24. That method defined in claim 23 characterized in the step of utilizing water having sufficient muriatic acid to provide a pH in the range of three to five.

25. That method defined in claim 24 characterized in the step of dispersing additional muriatic acid into the water as welding proceeds to maintain the pH between three and five.

* * * * *